US012621269B2

(12) United States Patent
Chiapponi et al.

(10) Patent No.: US 12,621,269 B2
(45) Date of Patent: May 5, 2026

(54) PROXY DETECTION SYSTEMS AND METHODS

(71) Applicant: AMADEUS S.A.S., Biot (FR)

(72) Inventors: Elisa Chiapponi, Nice (FR); Marc Dacier, Nice (FR); Olivier Thonnard, Nice (FR); Vincent Rigal, Nice (FR); Mohamed Fangar, Nice (FR)

(73) Assignee: AMADEUS S.A.S., Biot (FR)

( * ) Notice: Subject to any disclaimer, the term of this patent is extended or adjusted under 35 U.S.C. 154(b) by 173 days.

(21) Appl. No.: 18/408,096

(22) Filed: Jan. 9, 2024

(65) Prior Publication Data

US 2024/0356899 A1     Oct. 24, 2024

Related U.S. Application Data

(60) Provisional application No. 63/497,053, filed on Apr. 19, 2023.

(51) Int. Cl.
H04L 9/40          (2022.01)
(52) U.S. Cl.
CPC ...... H04L 63/0281 (2013.01); H04L 63/0245 (2013.01); H04L 63/166 (2013.01)
(58) Field of Classification Search
CPC ............. H04L 63/0281; H04L 63/0245; H04L 63/166; H04L 2463/121; H04L 2463/144; H04L 63/0236; H04L 63/1416; H04L 63/1458; H04L 69/16; H04L 69/163
See application file for complete search history.

(56) References Cited

U.S. PATENT DOCUMENTS

| | | | |
|---|---|---|---|
| 8,332,510 B2 | 12/2012 | Khosravi et al. | |
| 10,069,837 B2 | 9/2018 | Turgeman et al. | |
| 10,225,177 B2 | 3/2019 | Li et al. | |

(Continued)

FOREIGN PATENT DOCUMENTS

| | | |
|---|---|---|
| AU | 2003228703 A1 | 12/2003 |
| CN | 101895552 A | 11/2010 |

(Continued)

OTHER PUBLICATIONS

Sahu, Abhijeet, et al. "Design and evaluation of a cyber-physical testbed for improving attack resilience of power systems." IET Cyber-Physical Systems: Theory & Applications 6.4 (2021): 208-227.

(Continued)

*Primary Examiner* — Amie C. Lin
(74) *Attorney, Agent, or Firm* — Perry + Currier Inc.

(57) ABSTRACT

A method includes receiving, from a client device, a first request to establish a transport-layer connection between the client device and the server, the first request containing a first source port number; in response to receiving the first request, initiating a delay timer and withholding transmission of an acknowledgement to the first request until expiry of the delay timer; receiving from the client device, prior to expiry of the delay timer, a second request to establish the transport-layer connection; determining whether the second request contains a second source port number matching the first source port number; and selecting, based on the determination, a handling action for the second request.

20 Claims, 7 Drawing Sheets

(56)           References Cited

U.S. PATENT DOCUMENTS

| | | | | |
|---|---|---|---|---|
| 10,673,992 | B1* | 6/2020 | Weiser | H04L 69/16 |
| 10,728,131 | B2* | 7/2020 | Jung | H04L 47/283 |
| 10,986,109 | B2 | 4/2021 | Howard et al. | |
| 11,196,712 | B1 | 12/2021 | Norbutas | |
| 2002/0161925 | A1* | 10/2002 | Munger | H04L 63/08 |
| | | | | 709/241 |
| 2004/0210663 | A1* | 10/2004 | Phillips | H04L 69/163 |
| | | | | 709/230 |
| 2005/0180327 | A1* | 8/2005 | Banerjee | H04L 47/43 |
| | | | | 370/236 |
| 2006/0168649 | A1* | 7/2006 | Venkat | H04L 63/1425 |
| | | | | 726/5 |
| 2009/0144408 | A1* | 6/2009 | Wilf | H04L 63/1441 |
| | | | | 709/224 |
| 2011/0246633 | A1 | 10/2011 | Khosravi et al. | |
| 2017/0012988 | A1 | 1/2017 | Turgeman et al. | |
| 2017/0310693 | A1 | 10/2017 | Howard et al. | |
| 2018/0152375 | A1 | 5/2018 | Li et al. | |

FOREIGN PATENT DOCUMENTS

| | | |
|---|---|---|
| CN | 109040128 A | 12/2018 |
| CN | 109361649 A | 2/2019 |
| CN | 111064827 B | 7/2020 |
| CN | 113395255 A | 9/2021 |
| EP | 2232810 B1 | 12/2013 |
| WO | WO-03098474 A1 | 11/2003 |

OTHER PUBLICATIONS

U.S. Appl. No. 17/746,556, Proxy Detection Systems and Methods, filed May 17, 2022.

Cao Zechun, "Intrusion Detection: Detecting Network Intruders Behind Anonymity Networks and Identifying Intruders on the Hosts by Modeling User Behaviors". Diss. 2020.

Hoogstraaten, J. M. "Evaluating server-side internet proxy detection methods.", MSC thesis, Cybersecurity Academy, (2018).

Mi, Xianghang, et al. "Resident evil: Understanding residential IP proxy as a dark service." 2019 IEEE symposium on security and privacy (SP). IEEE, 2019.

Tschacher Nikolai. "Is This a Valid Method to Detect Proxies?" Incolumitas.com, Nov. 27, 2021, downloaded on Sep. 15, 2022 from URL: https://incolumitas.com/2021/11/26/is-this-a-valid-method-to-detect-proxies/.

Webb, Allen T. et al. "Finding proxy users at the service using anomaly detection." 2016 IEEE Conference on Communications and Network Security (CNS). IEEE, 2016.

* cited by examiner

PROXY DETECTION SYSTEMS AND METHODS

CROSS-REFERENCE TO RELATED APPLICATIONS

This application claims priority to U.S. provisional patent application No. 63/497,053, filed Apr. 19, 2023, the contents of which is incorporated herein by reference.

BACKGROUND

Servers receive and respond to requests from client devices, e.g., to deliver data requested by the client devices in connection with web-based services. For certain services, responding to such requests can be computationally intensive. For example, servers handling search requests for travel-related services (e.g., flights, hotels, and the like) may incur significantly higher computational costs to generate responses to such requests than the costs incurred by other servers responsible for the retrieval of previously generated and indexed data.

The operators of the above-mentioned servers may derive little or no return for the cost of servicing fraudulent or abusive client requests. Upon detecting such requests, discarding or otherwise altering the usual request handling process may therefore be desirable, to reduce the allocation of computational resources to responding to such requests, with little likelihood of return, e.g., in the form of travel services being purchased from the server's operator. Fraudulent or abusive client requests, however, may be routed through proxy devices, which complicates their detection. Detecting such requests may be particularly challenging when the proxy devices are residential or other consumer-level devices that may also originate legitimate requests.

SUMMARY

An aspect of the specification provides a proxy detection method in a server, the method including: receiving, from a client device, a first request to establish a transport-layer connection between the client device and the server, the first request containing a first source port number; in response to receiving the first request, initiating a delay timer and withholding transmission of an acknowledgement to the first request until expiry of the delay timer; receiving from the client device, prior to expiry of the delay timer, a second request to establish the transport-layer connection; determining whether the second request contains a second source port number matching the first source port number; and selecting, based on the determination, a handling action for the second request.

Another aspect of the specification provides a server, including: a communications interface; and a processor configured to: receive via the communications interface, from a client device, a first request to establish a transport-layer connection between the client device and the server, the first request containing a first source port number; in response to receiving the first request, initiate a delay timer and withhold transmission of an acknowledgement to the first request until expiry of the delay timer; receive from the client device, prior to expiry of the delay timer, a second request to establish the transport-layer connection; determine whether the second request contains a second source port number matching the first source port number; and select, based on the determination, a handling action for the second request.

BRIEF DESCRIPTIONS OF THE DRAWINGS

Embodiments are described with reference to the following figures.

DETAILED DESCRIPTION

Figure 1:
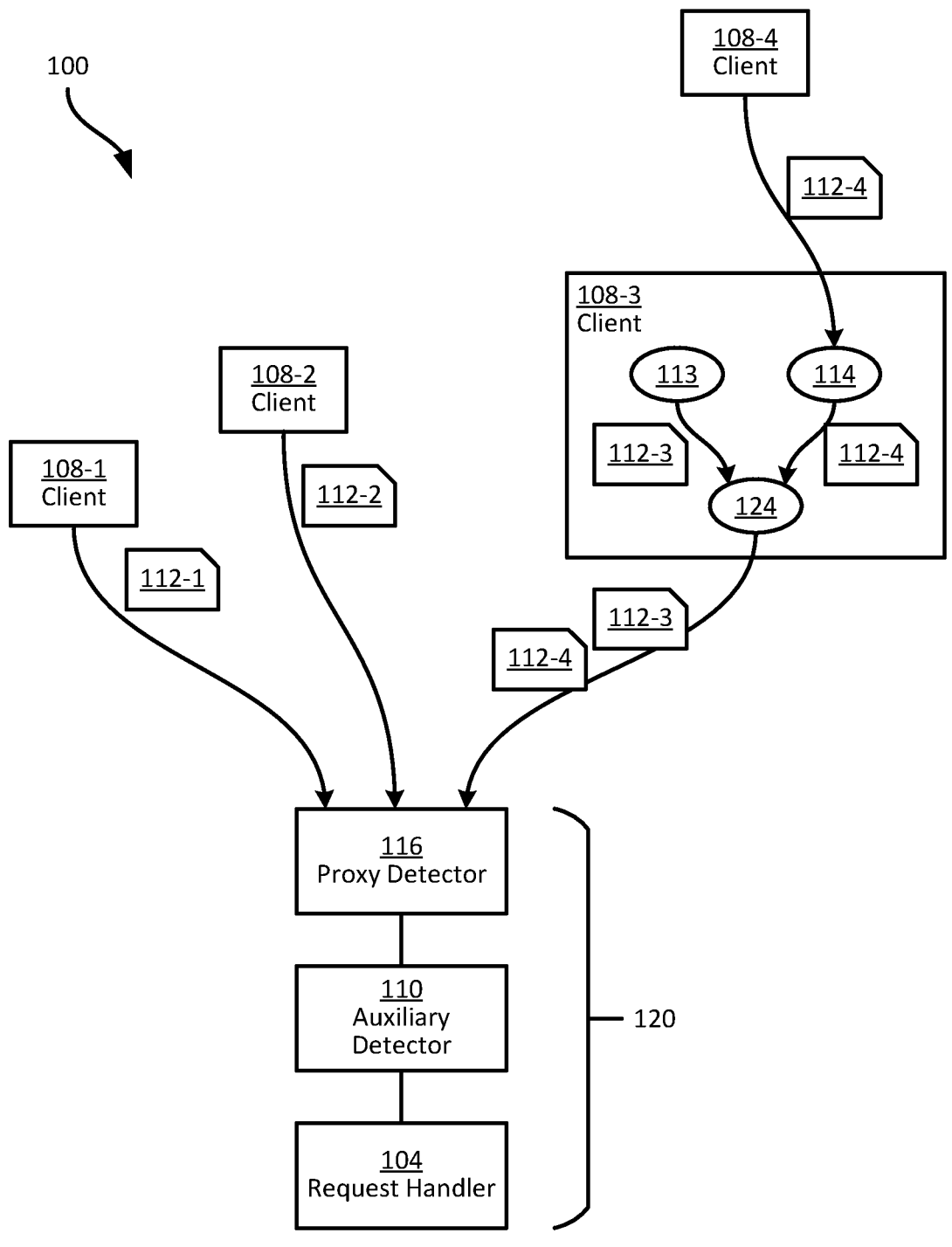
FIG. 1 is a diagram illustrating a communications system.

FIG. 1 depicts a communications system 100, including a request handler 104 and a plurality of client devices, referred to collectively as client devices 108 and generically as a client device 108. In the illustrated example, the system 100 includes four client devices 108-1, 108-2, 108-3, and 108-4, although it will be understood that the system 100 can include greater and smaller numbers of client devices 108 in other examples. The client devices 108 are computing devices such as desktop computers, smart phones, laptop computers, or the like. Each client device 108 thus includes suitable hardware elements, such as processing, storage and network communications components, as well as input and output devices (e.g., keyboards, touch panels, displays, and the like), enabling the client device 108 to communicate with the request handler 104 over a network or combination of networks. Communications between the client devices 108 and the request handler 104 include the transmission of requests from client devices 108 to the request handler 104, and the generation and transmission of responses to such requests from the request handler 104 to the relevant client devices 108.

The request handler 104 can be implemented as a server or a set of servers, configured to receive and process requests from the client devices 108. The request handler 104 therefore includes processing and storage hardware components, e.g., executing suitable software to receive and interpret client requests, as well as to generate and return response data to such requests. The requests may include, for example, search requests for travel-related goods or services, such as search requests for flights between specified origin and destination locations (e.g., particular cities or airports), on specified days, or the like. In order to generate response data for a client request, the request handler 104 can be configured to retrieve and process data from various repositories and/or interact with other computing devices (e.g., operated by airlines, or the like), to generate combinations of flights that satisfy search parameters set out in the client request.

The generation of response data can be computationally complex, as the availability and pricing of flights may be highly variable and dependent on the identity of an operator of the client device 108, among other factors. The costs (e.g., in terms of financial commitments, staffing, and the like) of the computational resources (e.g., processing time, storage capacity, and the like) allocated to handling search requests from the client devices 108 may be supported in part by purchases of the above-mentioned flights by operators of the client devices 108. Some client requests, however, are highly unlikely to lead to such purchases, and committing computational resources to generate responses to those requests may therefore not be desirable, from the perspective of the operator(s) of the request handler 104.

For example, some client requests are originated by scraper bots, and the results generated by the request handler 104 may be used to populate third-party search engines, storefronts, or the like. Such requests thus incur the computational and other costs of generating search results, but potentially deprive the operator of the request handler 104 of at least some of the financial return associated with those search results. As will be apparent to those skilled in the art, bot-originated requests are not the only type of client request that it may be desirable to detect and handle differently from other client requests. Bot-originated requests are simply discussed herein as an illustrative example.

Bot-originated requests such as those mentioned above, and/or other client requests that the operator of the request handler 104 may seek to detect and handle differently from other requests, may be detected based on the content of the requests, attributes of the requests' senders, or the like. The system 100 may include, for example, an auxiliary detector 110, e.g., in the form of an additional server or set of servers, and/or additional application(s) executed by the request handler 104.

The auxiliary detector 110 is configured to process incoming requests from the client devices 108 to determine whether each request is likely to have originated from a bot or other source for which differential handling is desired (e.g., sources presenting security risks, engaging in fraudulent behavior, or the like). A request may therefore be forwarded to the request handler 104 for further processing, for example, only if the auxiliary detector 110 determines a low likelihood that the request originated from a bot.

Bot-originated requests, however, may be obfuscated from detection by the auxiliary detector 110 by routing such requests through proxies. For example, the client devices 108-1 and 108-2 are shown transmitting respective requests 112-1 and 112-2 to the request handler 104 in FIG. 1. The requests 112-1 and 112-2 are generated at the client devices 108-1 and 108-2 themselves. The client device 108-3, on the other hand, is shown transmitting distinct requests 112-3 and 112-4 to the request handler 104. The request 112-3 may be generated at the client device 108-3, e.g., via input data provided by an operator of the client device 108-3 and processed by a client application 113 (e.g., a web browser or the like) executed by the client device 108-3. The request 112-4, however, originated not at the client device 108-3, but at a distinct client device 108-4 employing the client device 108-3 as a proxy. In some examples, additional computing devices may handle the request 112-4 between the client device 108-4 and the client device 108-3. For example, a superproxy (not shown) can be configured to receive instructions from the client device 108-4 (e.g., executing a scraper bot application) and generate numerous individual requests for transmission via distinct proxies such as the client device 108-3.

The request 112-4 can therefore be received at the client device 108-3 by a separate application 114 which, in some cases, may have been installed at the client device 108-3 without the knowledge or consent of the operator of the client device 108-3. Via execution of the application 114, the client device 108-3 can be controlled to forward the request 112-4 to the request handler 104, and to relay any response from the request handler 104 to the client device 108-4.

Various mechanisms are available to detect proxied requests such as the request 112-4, enabling proxied requests to be handled differently from non-proxied requests 112 (e.g., the requests 112-1, 112-2, and 112-3). For example, proxy detection can include filtering requests based on blacklisted Internet Protocol (IP) addresses, or the like. Those mechanisms, however, may only detect a portion of proxied requests. Further, the effectiveness of those detection mechanisms may be reduced for certain forms of proxied request. In the illustrated system, for example, the client device 108-3 is referred to as a residential proxy, in that the client device 108-3 is a consumer-level computing device that is unlikely to trigger conventional proxy-detection mechanisms. The client device 108-3, as seen above, can also originate legitimate (e.g., not bot-originated) requests that are preferably processed by the request handler 104 in the same manner as the requests 112-1 and 112-2, in addition to proxied requests (e.g., the request 112-4) for which modified handling may be desirable.

To detect proxied requests in general, and requests routed via residential proxies in particular, the system 100 therefore also includes a proxy detector 116. The proxy detector 116 can be implemented as a distinct computing device (e.g., one or more servers) from the auxiliary detector 110 and the request handler 104. In other examples, the proxy detector 116 can be implemented as an additional software application executed at the computing device(s) implementing the auxiliary detector 110 and/or the request handler 104. As will be discussed below in greater detail, the proxy detector 116 is deployed as the first entity in a request-handing subsystem 120 with which the client devices 108 communicate. That is, transport-layer connections and secure links are established between the client devices 108 and the proxy detector 116, rather than between the client devices 108 and the auxiliary detector 110 or the request handler 104.

As will be apparent, the client requests 112 are generally implemented as sequences of messages, e.g., to establish communications between a client device 108 and the proxy detector 116, to serve web content or the like to the client device 108, and to receive the above-mentioned search request from the client device. Establishing communications between a client device 108 and the proxy detector 116 typically involves establishing a transport-layer connection, e.g., based on the Transport Control Protocol (TCP) or another suitable transport-layer protocol. Once the transport-layer connection is established, a secure link is established over the transport-layer connection, e.g., based on the Transport Layer Security (TLS) protocol, Secure Sockets Layer (SSL) protocol, or the like. Web content, search requests, response data and the like, can then be exchanged over the secure link.

The proxy detector 116 is configured to inspect at least some of the above-mentioned messages to determine whether the client device 108 is likely to be operating as a proxy. The processes implemented by the proxy detector 116 reflect two differences in the generation and transmission of proxied and non-proxied requests 112.

First, establishing a TCP connection involves a three-way handshake, beginning with a SYN packet. In the context of the system 100, a client device 108 transmits a SYN packet containing a source address such as an IP address and a port number, as well as a packet sequence number. The IP address of the client device 108 can be assumed to be constant for the duration of the exchange of messages with the subsystem 120, but is often not under the direct control of the client device 108. The port number, however, can be selected by the client device 108, e.g., by the application 113 or 114 in the case of the client device 108-3, from a wide range of available port numbers. The sequence number can also be selected locally, e.g., by the client application 113 or 114. When a SYN packet has been transmitted, the client device 108 awaits a SYN/ACK packet from the subsystem 120. If no SYN/ACK packet is received within a certain time period, the client device 108 may retransmit the original SYN packet, with the same source address and sequence number.

Retransmission of the SYN packet (as well as other messages) is generally controlled at the kernel level in the client device 108, e.g., by a network interface driver 124 or the like. For example, the driver 124 can be configured to retransmit a SYN packet until a SYN/ACK packet is received, according to exponential backoff logic by which retransmissions occur further apart in time (e.g., after one second, then two seconds, then four seconds) until a timeout is reached. The application 113 need not control the retransmission process. It has been observed, however, that certain residential proxy service providers, which deploy proxy applications such as the application 114, control at least some packet retransmissions (e.g., for SYN packets) at the application layer rather than the kernel layer. For example, the application 114 itself may monitor for the receipt of a SYN/ACK packet, and if none is received within a certain time period (e.g., one second), the application 114 may instruct the driver 124 to terminate the connection and open a new connection. The effect of such a process is still to transmit another SYN packet to the subsystem 120, but the new SYN packet contains a different source port number, and may also contain a different sequence number. Those characteristics can be exploited to distinguish between proxied and non-proxied requests.

Second, a transport-layer connection can be established between the proxy detector 116 and the client device 108 representing the nearest transport-layer device (i.e., ignoring routing hardware implementing link-layer and other lower-level functions) to the proxy detector 116. The secure link, however, is established with the ultimate client endpoint, e.g., the device executing the web browser or other application that initiated communication with the subsystem 120 via the proxy.

In the case of non-proxied requests, the nearest transport-layer device and the client endpoint are one and the same, e.g., the client device 108-1 for the request 112-1. In the case of proxied requests, however, the client endpoint does not reside at the nearest transport-layer device. In the context of FIG. 1, for example, the nearest transport-layer device involved in transmission of the client request 112-4 is the client device 108-3, but the client endpoint is the client device 108-4. The proxy detector 116 can be configured, via the above-mentioned message inspection, to determine round-trip time periods associated with the transport-layer connection and the secure link, and to assess whether the client device 108 is likely to be operating as a proxy based on those time periods. Of particular note, the proxy detector 116 can perform the above-mentioned inspection and assessment without modifying the messages themselves or the processes by which the client devices 108 establish communications with the subsystem 120 (e.g., without delivering executable code or other content to the client devices 108 that would not have been delivered in the absence of the proxy detector 116).

Figure 2:
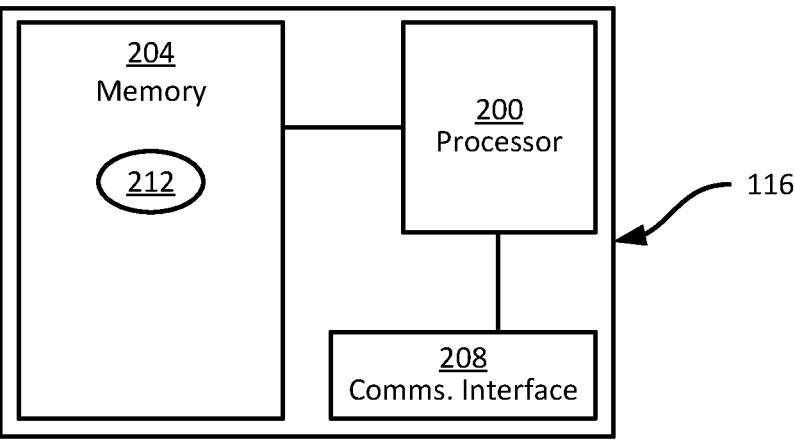
FIG. 2 is a diagram illustrating certain internal components of the proxy detector of FIG. 1.

Before discussing the operation of the system 100, and in particular the functionality of the proxy detector 116, in greater detail, certain internal components of the proxy detector 116 will be described with reference to FIG. 2.

As noted above, the proxy detector 116 can be implemented as a server in the subsystem 120, distinct from the auxiliary detector 110 and the request handler 104. In the illustrated example, the proxy detector 116 includes at least one processor 200, such as a central processing unit (CPU) or the like. The processor 200 is interconnected with a memory 204, implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communications interface 208, which enables the proxy detector 116 to communicate with the other computing devices of the system 100. The communications interface 208 therefore includes any necessary components (e.g., network interface controllers (NICs), radio units, and the like) to enable such communication. The proxy detector 116 can also include input and output devices connected to the processor 200, such as keyboards, mice, displays, and the like (not shown). In other examples, input and output devices can be connected to the proxy detector 116 remotely, via another computing device (not shown).

The components of the proxy detector 116 mentioned above can be deployed in a single enclosure, or in a distributed format. In some examples, therefore, the proxy detector 116 includes a plurality of processors, either sharing the memory 204 and communications interface 208, or each having distinct associated memories and communications interfaces. Implementing the proxy detector 116 in a distributed format can enable scaling of the computational resources available to the proxy detector 116, geographic distribution of the functionality provided by the proxy detector 116, and the like.

The memory 204 stores a plurality of computer-readable programming instructions, executable by the processor 200. The instructions stored in the memory 204 include a proxy detection application 212, execution of which by the processor 200 configures the processor 200 to perform various functions related to the above-mentioned inspection and assessment of message exchanged with the client devices 108 to detect client devices 108 operating as proxies. In some examples, the application 212 can be implemented as a set of distinct applications, e.g., a packet sniffer application to collect incoming and outgoing messages, and an analysis application to assess the above-mentioned time periods.

In other examples, as noted earlier, the proxy detector 116 can be implemented on computing hardware shared with either or both of the auxiliary detector 110 and the request handler 104. For example, the memory 304 can store not only the application 212, but also one or more other applications implementing the functionality of the detector 110 and/or request handler 104. In such embodiments, the application 212 is configured as the endpoint for communications addressed to the illustrated computing platform. That is, the application 212, and not the applications implementing auxiliary detection and/or response handling, is configured to handle the establishment of communications with client devices 108. Configuring the application 212 (or the proxy detector 116 more generally, if the proxy detector 116 is implemented in distinct hardware from the other components of the subsystem 120) as the endpoint enables the application 212 to inspect messages transmitted by the nearest transport-layer device, as well as the client endpoint.

Figure 3:
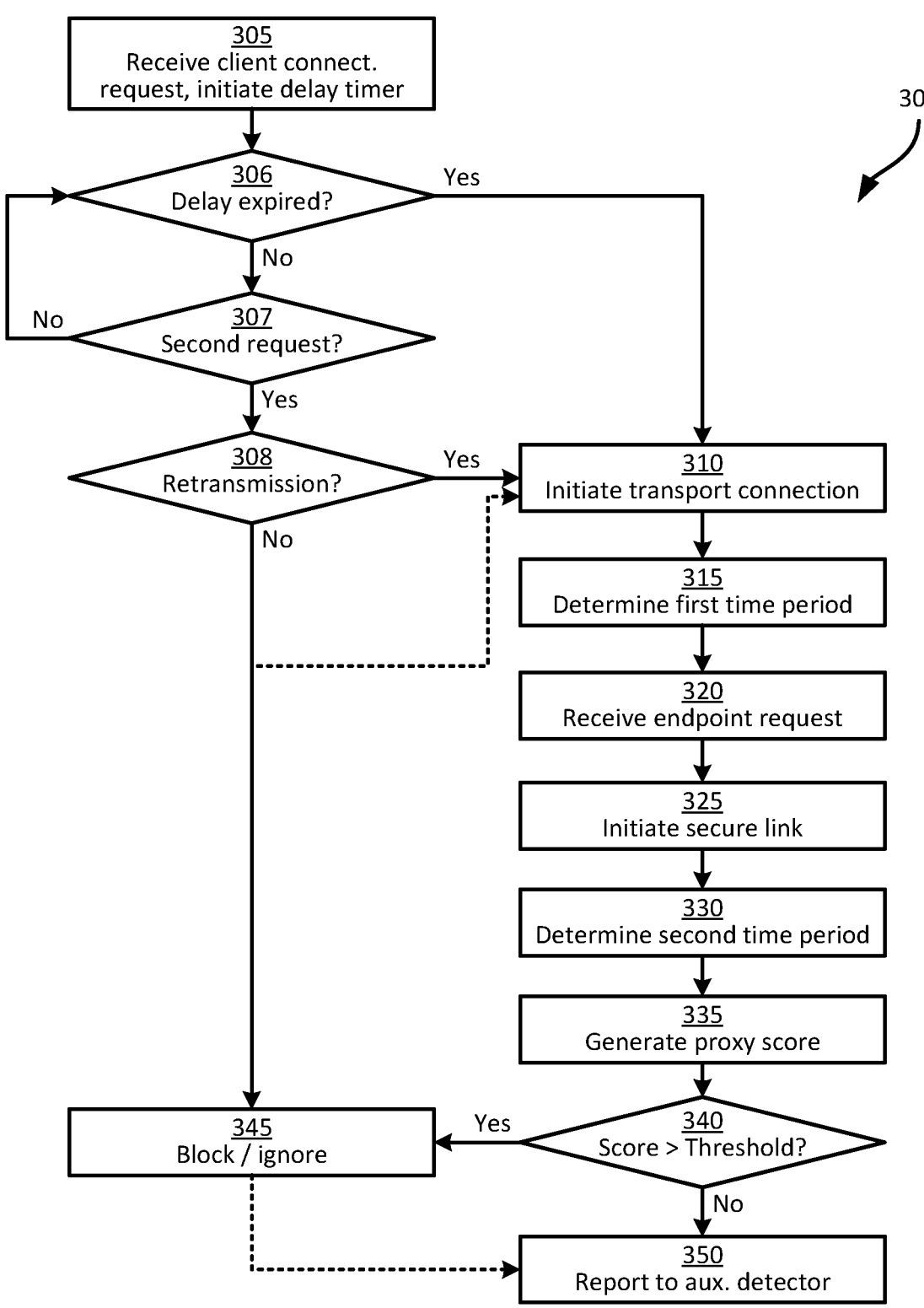
FIG. 3 is a flowchart of a proxy detection method.

Turning to FIG. 3, a method 300 of proxy detection is illustrated. The method 300 will be described below in conjunction with its performance in the system 100, and in particular by the proxy detector 116, e.g., via execution of the application 212 by the processor 200.

At block 305, the proxy detector 116 is configured to receive a first request from a client device 108. The first request is a request to establish a transport-layer connection between the client device 108 and the proxy detector 116, e.g., a TCP-based connection as noted earlier. The request may include, for example, a TCP SYN message containing a sequence number, an identifier of the client device 108 (e.g., an IP address and a port number), or the like. In response to receiving the first request, instead of responding substantially immediately with a SYN/ACK message or functionally equivalent message, the proxy detector 116 is configured to initiate a delay timer. The proxy detector 116 is further configured to withhold the transmission of an acknowledgement to the first request (e.g., a SYN/ACK message) until the delay timer has expired. In some examples, the proxy detector 116 may choose not to send an acknowledgement at all, while in other examples, an acknowledgement is sent after the delay timer has expired.

The delay timer has a predetermined length, e.g., stored as a configuration setting in the application 212 or another suitable location in the memory 204. Because the proxy detector 116 will delay transmission of an acknowledgement to both proxied and non-proxied requests 112, the delay impacts legitimate clients as well as clients executing scraper-bots or the like. The delay timer is therefore selected to facilitate proxy detection, while mitigating the impact of the delay on legitimate client requests 112.

Many clients 108 are configured, e.g., via the driver 124, to begin retransmitting packets such as the above-mentioned SYN packets when no acknowledgement is received within one second of transmission of the first request. As a result, the application 114 may also be configured to manage retransmission beginning about one second after the first request is transmitted, overriding management of retransmissions by the driver 124. The delay timer, in the present example, is therefore selected to be greater than about one second, and smaller than about two seconds (thus reducing the delay experienced by operators of client devices 108 before receiving response data from the subsystem 120). For example, the delay timer can be set at about 1.5 seconds. In other examples, depending on the behavior of client devices 108, the delay timer may be longer or shorter. In general, the delay timer is longer than a common period after which a legitimate client device 108 is expected to retransmit the first request.

Having initiated the delay timer at block 305, the proxy detector 116 is then configured to monitor incoming messages for a second request from the same client device 108. As shown in FIG. 3, at block 306 the proxy detector 116 is configured to determine whether the delay timer has expired. When the determination at block 306 is negative, the proxy detector 116 proceeds to block 307, to determine whether the same client device 108 has sent a further (e.g., second) request to establish the transport-layer connection. The second request can be distinguished from other, unrelated, requests received at the proxy detector 116, from other client devices 108, because the second request includes the same IP address or other suitable identifier of the client device 108 as the first request from block 305. In other words, any requests received after the first request from block 305 that do not contain the same IP address can initiate separate instances of the method 300, but have no impact on the present example performance of the method 300.

When the determination at block 307 is negative, the proxy detector 116 returns to block 306, and continues to monitor for a second request as long as the delay timer has not expired. When the determination at block 307 is affirmative, the proxy detector 116 proceeds to block 308, to assess whether the second request is a retransmission of the first request (as expected from a legitimate client, sent under the control of the driver 124).

The first request from block 305, and the second request from block 307, include source addresses corresponding to the transmitting client device 108, such as an IP address and a port number. As noted earlier, the IP address is generally not under the direct control of the client device, and within the relatively short timeframe during which the method 300 is performed, the IP address remains static. The port number, however, is controlled at the client device 108. The determination at block 308 can include determining whether the second request includes a source port number that matches the source port number from the first request. In some examples, the determination at block 308 can also include determining whether a sequence number from the first request matches a sequence number from the second request. As also noted earlier, sequence numbers are also controlled by client devices 108.

When the source port numbers of the first and second requests match, the determination at block 308 can be affirmative. Matching source port numbers indicate that the second request is likely a kernel-managed retransmission of the first request from block 305, and that the originating client device 108 is therefore unlikely to be acting as a gateway in a residential proxy system.

When the source port numbers of the first and second requests do not match, or when the sequence numbers of the first and second requests do not match, the determination at block 308 is negative. In other words, when either or both of the source port numbers and the sequence numbers are mismatched between the first and second requests, the proxy detector 116 can determine that the client device 108 is likely to be acting as a residential proxy gateway.

Based on the determination at block 308, the proxy detector 116 is configured to select a handling action for the second request (or more generally, for the current attempt to establish a connection by the client device 108 that originated the first and second requests). Following an affirmative determination at block 308, the proxy detector 116 can proceed to block 310 to complete the handshake for establishing a transport-layer connection, as discussed below. When the determination at block 308 is negative, the proxy detector 116 can proceed instead to either or both of blocks 345 and 350, also discussed further below. In general, following a negative determination at block 308, the proxy detector 116 can be configured to not complete the establishment of a transport-layer connection with the client device 108. In some examples, the proxy detector 116 can be configured to complete the transport-layer connection by proceeding to block 310 (as shown by the dashed line from the "No" determination at block 308 towards block 310), and to also report an indication at block 350 that the client device 108 may be operating as a residential proxy, e.g., to the auxiliary detector 110 for subsequent action.

Figure 4A:
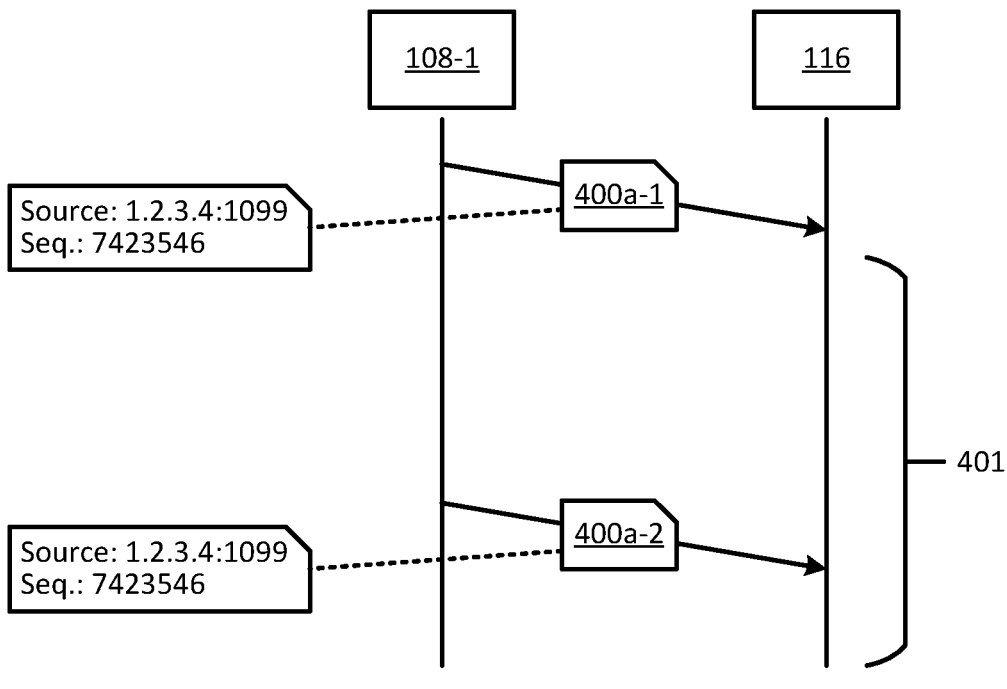
FIG. 4A is a diagram illustrating an example performance of blocks 305 to 308 of the method of FIG. 3.

Turning to FIG. 4A, an example performance of blocks 305 to 308 is illustrated, in which the client device 108-1 transmits a first request 400a-1 to the proxy detector 116. The first request 400a-1, such as a SYN packet, includes a source IP address and source port number (e.g., "1.2.3.4:1099"), as well as a sequence number (e.g., "7423546"). The first request 400a-1 may also include other information, such as the address of the proxy detector 116, but such other information is omitted for simplicity.

In response to receiving the first request 400a-1 at block 305, the proxy detector 116 initiates a delay timer 401 (e.g., of 1.5 seconds), and monitors for the receipt of a second request at block 306. Having failed to receive an acknowledgement from the proxy detector 116 within a predetermined interval (e.g., one second), the client device 108-1 retransmits the first request 400a-1, as a second request 400a-2. As seen in FIG. 4A, the second request 400a-2 contains the same source identifier, including both the same source IP address and source port number, as well as the same sequence number. The determination at block 308 is therefore affirmative, indicating that the client device 108-1 is less likely to be a residential proxy gateway.

Figure 4B:
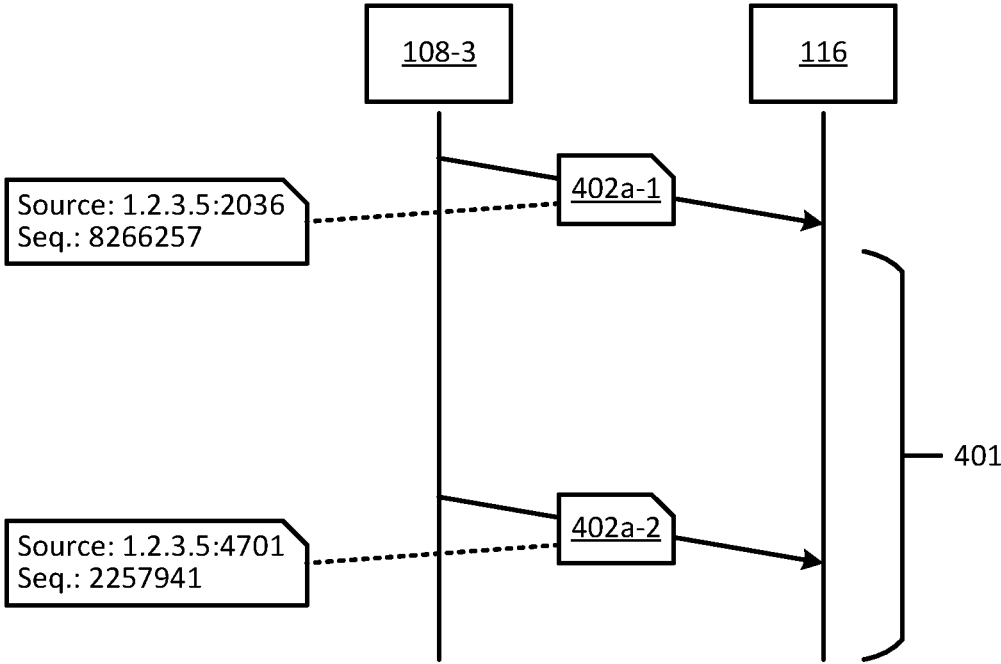
FIG. 4B is a diagram illustrating another example performance of blocks 305 to 308 of the method of FIG. 3.

FIG. 4B illustrates another example performance of blocks 305 to 308, in which the proxy detector 116 receives a first request 402a-1 from the client device 108-3 (e.g., generated by the application 114). The first request 402a-1 includes a first source IP address and port number (e.g., "1.2.3.5:2036"), as well as a first sequence number (e.g., "8266257"). In response to receiving the first request 402a-1, the proxy detector 116 initiates the delay timer 401, and monitors for a second request from the client device 108-3 (e.g., a second request with the IP address "1.2.3.5").

When a period of time (e.g., one second) has elapsed at the client device 108-3 without receipt of an acknowledgement from the proxy detector 116, the application 114 can terminate the attempted TCP connection, e.g., instructing the driver 124 to cease managing the connection and thus preventing the driver 124 from retransmitting the first request 402a-1. Instead, the application 114 can initiate a new transport-layer connection, transmitting a second request 402a-2 that contains the same IP address but, because the connection is new, a different port number (e.g., "4701") and sequence number (e.g., "2257941"). Because neither the source port number nor the sequence number of the second request 402a-2 match the source port number and the sequence number of the first request 402a-1, the determination at block 308 is negative.

Returning to FIG. 3, following an affirmative determination at block 308, the proxy detector 116 can proceed to block 310. In some examples, if the delay timer expires without receipt of a second request, leading to an affirmative determination at block 306, the proxy detector can also proceed to block 310. In other examples, if the delay timer expires without receipt of a second request, the proxy detector 116 can terminate performance of the method 300, e.g., on the assumption that the client device (whether acting as a proxy or not) has abandoned the attempt to establish a connection with the proxy detector 116.

Figure 5:
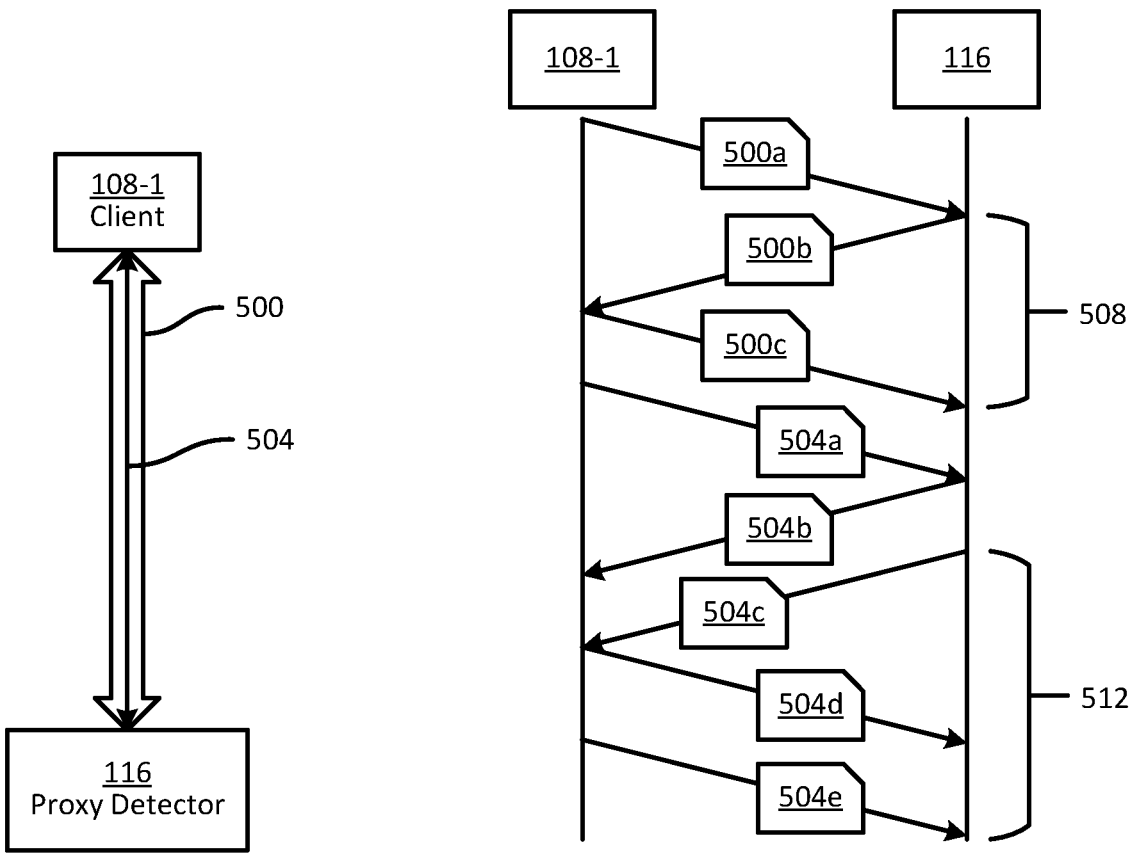
FIG. 5 is a diagram illustrating an example performance of blocks 310 to 340 of the method of FIG. 3.
Figure 5:
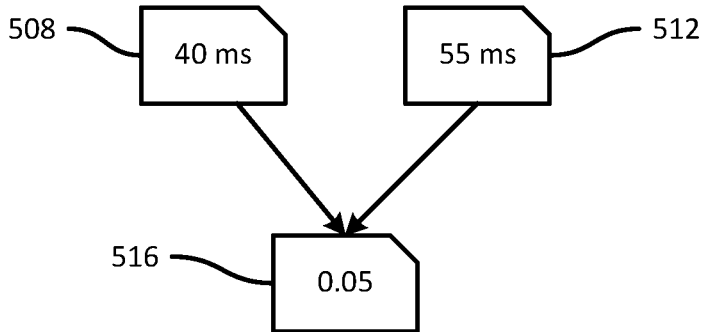

At block 310, in response to the affirmative determination at block 308 (or, in some examples, accompanying the reporting of a possible residential proxy following a negative determination at block 308, or expiry of the delay timer at block 306), the proxy detector 116 is configured to send a message (or the first in a series of messages, depending on the protocol employed to establish the transport-layer connection) to the client device 108, according to a handshake sequence defined by the relevant protocol. Turning briefly to FIG. 5, the client device 108-1 and the proxy detector 116 are shown in isolation, along with a sequence diagram illustrating various messages exchanged between the client device 108-1 and the proxy detector 116.

In particular, to establish a transport-layer connection 500, the client device 108-1 sends a first request 500a (e.g., the above-mentioned SYN message) to the proxy detector 116. At block 310, the proxy detector 116 transmits a message 500b, such as a SYN-ACK message (in TCP-based embodiments), containing an acknowledgement of the request 500a, as well as a sequence number and/or other relevant information. The proxy detector 116 can also store a timestamp representing the time at which the message 500a was received.

The handshake sequence continues with a further message 500c from the client device 108-1, e.g., an ACK packet acknowledging the message 500b. In this example, following receipt of the message 500c at the proxy detector 116, the transport-layer connection 500 is established, and can be used to exchange other data, e.g., to establish a secure link 504, discussed further below. As will be apparent to those skilled in the art, the handshake sequence used to establish the connection 500 need not be exactly as discussed above, depending on the protocol employed to establish the connection 500.

The proxy detector 116 is also configured to store timestamps representing the time at which the message 500b was sent, and the time at which the message 500c was received. Returning to FIG. 3, at block 315 the proxy detector 116 is configured to determine a first time period associated with the transport-layer connection, e.g., associated with the above-mentioned handshake sequence. In this example, at block 315 the proxy detector 116 is configured to determine a time period elapsed between the transmission of the message 500b (i.e., the initiation of block 310), and receipt of the message 500c. The measured time period, as will now be apparent, represents the round trip time (RTT) between the client device 108-1 and the proxy detector 116, and is illustrated as a time period 508 in FIG. 5. Although the RTT measurement at block 315 is discussed in connection with the handshake sequence for establishing the connection 500, in other examples the RTT can be determined after the connection 500 is established, e.g., from any other suitable pair of messages exchanged between the client device 108-1 and the proxy detector 116. A suitable pair of messages is a pair in which the first originates at the proxy detector 116, and the second necessarily follows the first and is expected to be transmitted by the client device 108-1 substantially immediately upon receipt of the first.

In other examples, at block 315 the proxy detector 116 can determine the first time period based on historical data, reference data, or the like, e.g., instead of a measurement performed relative to the currently active client device 108. For example, the proxy detector 116 can store a reference first time period corresponding to an expected RTT for establishing a TCP connection with the nearest endpoint. For example, the detector 116 can store average TCP RTTs for each of a plurality of geographic regions, and can select a reference RTT among those stored based on an estimated location of the client device 108 (e.g., obtained based on the IP address of the client device 108). The detector 116 can also store a statistical distribution of RTT values, e.g., per geographic location, and the determination at block 315 can include sampling the distribution.

Returning to FIG. 3, at block 320 the proxy detector 116 is configured to receive a second request, to establish a secure link over the transport-layer connection (e.g., the connection 500 shown in FIG. 5). The secure link is between a client endpoint and the proxy detector 116, although it is not yet known whether the client endpoint is co-located with the client device 108 (i.e., with the device 108 from which the request at block 305 was received).

In response to the second request at block 320, the proxy detector 116 is configured to transmit a message initiating a handshake sequence according to a selected protocol, to establish a secure link with the client endpoint. In the present example, the protocol employed to establish the secure link is the TLS protocol, although other suitable protocols may be employed. It will be apparent that the handshake sequence involved in establishing the secure link will vary with the protocol employed at block 325.

Returning to FIG. 5, to establish the secure link 504 over the connection 500, the client device 108-1 can transmit a request 500a, such as a 'Client Hello' message as defined in the TLS protocol. For example, the request 500a can contain an indication of the supported protocol version (e.g., TLS 1.2 or 1.3), indications of cipher suites supported by the client device 108-1, a random number (e.g., for generation of a shared master secret, later used to generate encryption keys) and the like.

In response to the message 500a, the proxy detector 116 transmits a message 500b, such as an acknowledgment of the message 500a, to the client device 108-1. The proxy detector 116 can then transmit one or more further messages as dictated by the handshake sequence defined by the relevant security protocol. For simplicity of illustration, FIG. 5 shows one additional message 500c sent by the proxy detector 116. The message 500c can include, for example, the 'Server Hello' message as defined in the TLS protocol. The message 500c can contain a protocol version and cipher suites supported by the proxy detector 116, a further random number for later use in key generation. The message 500c can also include a server certificate, or the like.

In response to the message 500c, the client device 108-1 returns an acknowledgement message 500d, and can then send a final message 500e to complete the handshake sequence, such as a 'Change cipher' message in the TLS 1.3 protocol, or a 'Client key exchange' message in the TLS 1.2 protocol.

Referring again to FIG. 3, at block 330 the proxy detector 116 is configured to determine a second time period associated with the above-mentioned handshake sequence to establish the secure link 504. As noted earlier in connection with block 315, the proxy detector 116 is configured to maintain timestamps associated with the transmission of the messages 500b and 500c, as well as with the receipt of the messages 500a, 500d, and 500e. The time period determined at block 330 represents a round-trip time for the establishment of the secure link 504. That is, the RTT measured at block 330 is the time elapsed between the transmission of a message by the proxy detector 116, and the receipt of a following message (e.g., expected to be transmitted substantially immediately by the client endpoint in response to the message from the proxy detector 116) from the client endpoint. In the example shown in FIG. 5, the proxy detector 116 determines a second time period 512 elapsed between transmission of the message 500c, and receipt of the message 500e.

Of particular note, although the example shown in FIG. 5 involves determining the second time period based on messages exchanged during the handshake sequence, in other examples the time period can be determined based on other messages, after establishment of the secure link 504. The messages employed to determine the RTT at block 330 are selected, however, to ensure that they travel between the proxy detector 116 and the client endpoint, whether or not the client endpoint is behind a proxy. Thus, certain messages, such as acknowledgement messages, may not be suitable for use at block 330 because they cannot be guaranteed to have originated at the client endpoint. In the example of FIG. 5, the messages 500c and 500e are employed because the information contained in those messages is required to establish the secure link 504, and therefore cannot be generated by an intermediate proxy.

Upon determining the second time period, the proxy detector 116 is configured to generate a score indicating a likelihood that the client device 108 (e.g., the client device 108-1, in the example of FIG. 5) is operating as a proxy for the client endpoint. In other examples, the determination at block 315 can be performed substantially simultaneously with the determination at block 330, given that the proxy detector 116 can store timestamps associated with the messages exchanged during the above-mentioned handshake sequences and/or subsequent communications with the client device 108.

Generation of the score at block 335 is based on the first and second time periods, i.e., on the RTT associated with the transport-layer connection 500, and the RTT associated with the secure link 504. Turning to FIG. 5, solely for illustrative purposes, the first time period is assumed to be forty milliseconds, and the second time period is assumed to be fifty-five milliseconds. These time periods are provided by way of example only, and it will be apparent that varying network conditions between client devices 108 and the proxy detector 116 may lead to a wide variety of other time periods. However, it is expected that non-proxied client requests exhibit smaller differences between the first and second time periods than proxied client requests.

The score determined at block 335, therefore, assesses whether a difference between the first and second time periods indicates that the client device 108 with which the transport-layer connection is established is operating as a proxy for the client endpoint with which the secure link is established.

A wide variety of mechanisms for determining the score at block 335 are contemplated. For example, returning to FIG. 5, the proxy detector can determine a difference between the time periods 508 and 512 (e.g., fifteen milliseconds, in this example), and normalize that difference to a predefined range, based on a configurable maximum difference. For instance, the proxy detector can normalize the difference of fifteen milliseconds to a range between zero and one, with one representing a difference of three hundred milliseconds or more (e.g., the score can be capped at a value of one). In the illustrated example, therefore, the proxy detector 116 generates a score 516 of 0.05 (i.e., 15 ms/300).

In other examples, the score can be the difference itself, without normalization. In further examples, the score can be generated by determining the sum of the two time periods, and/or by normalizing the sum according to a predefined range. Various other mechanisms will also occur to those skilled in the art for generating the score. Any mechanism selected for generating the score at block 335 reflects the fact that when the transport-layer connection is established with a client device 108 that is also the client endpoint for the secure link subsequently established over the transport-layer connection, the separation between first and second time periods is expected to be relatively small. In contrast, when the transport-layer connection is established with a client device 108 that is not the client endpoint, the separation between the first and second time periods is expected to be greater. Thus, the score-generation mechanism is selected to produce higher (or lower) scores for greater differences between time periods, and lower (or higher) scores for smaller differences between time periods.

Following generation of the score at block 335, the proxy detector 116 can select a handling action for the client request 112, and/or for subsequent client requests 112 using the same secure link. For example, at block 340, the proxy detector 116 can be configured to compare the score to a threshold. In examples in which higher scores indicate higher likelihoods of proxying, therefore, the proxy detector 116 can determine whether the score exceeds a previously defined threshold. When the determination is affirmative, indicating that the relevant client device 108 is likely operating as a proxy, the proxy detector 116 can discard subsequent requests over the secure link at block 345, block/terminate the secure link previously established, or the like.

As noted earlier, a negative determination at block 308 can also lead to block 345, in which case no TCP connection is established with the client device 108, and blocks 310-340 are not performed. In some examples, however, following a negative determination at block 308, the proxy detector 116 can complete the TCP connection or other suitable transport-layer link, and perform blocks 315-340. In such examples, the proxy detector 116 can also perform block 350, however (e.g., bypassing block 345), by providing an indication to the auxiliary detector 110 that the client device 108 is likely to be a proxy. For example, the indication following an affirmative determination at block 308 can include a predetermined flag indicating proxy-like retransmission behavior.

When the determination at block 340 is negative, the proxy detector 116 can forward any client requests received over the secure link to the auxiliary detector 110 and/or request handler 104, along with the score, at block 350. In some examples, blocks 340 and 345 are omitted, and the proxy detector 116 simply forwards the score and request(s) to the auxiliary detector 110. The auxiliary detector 110 can be configured to determine whether the request(s) are likely to have been generated by a bot, based at least in part on the score.

Figure 6:
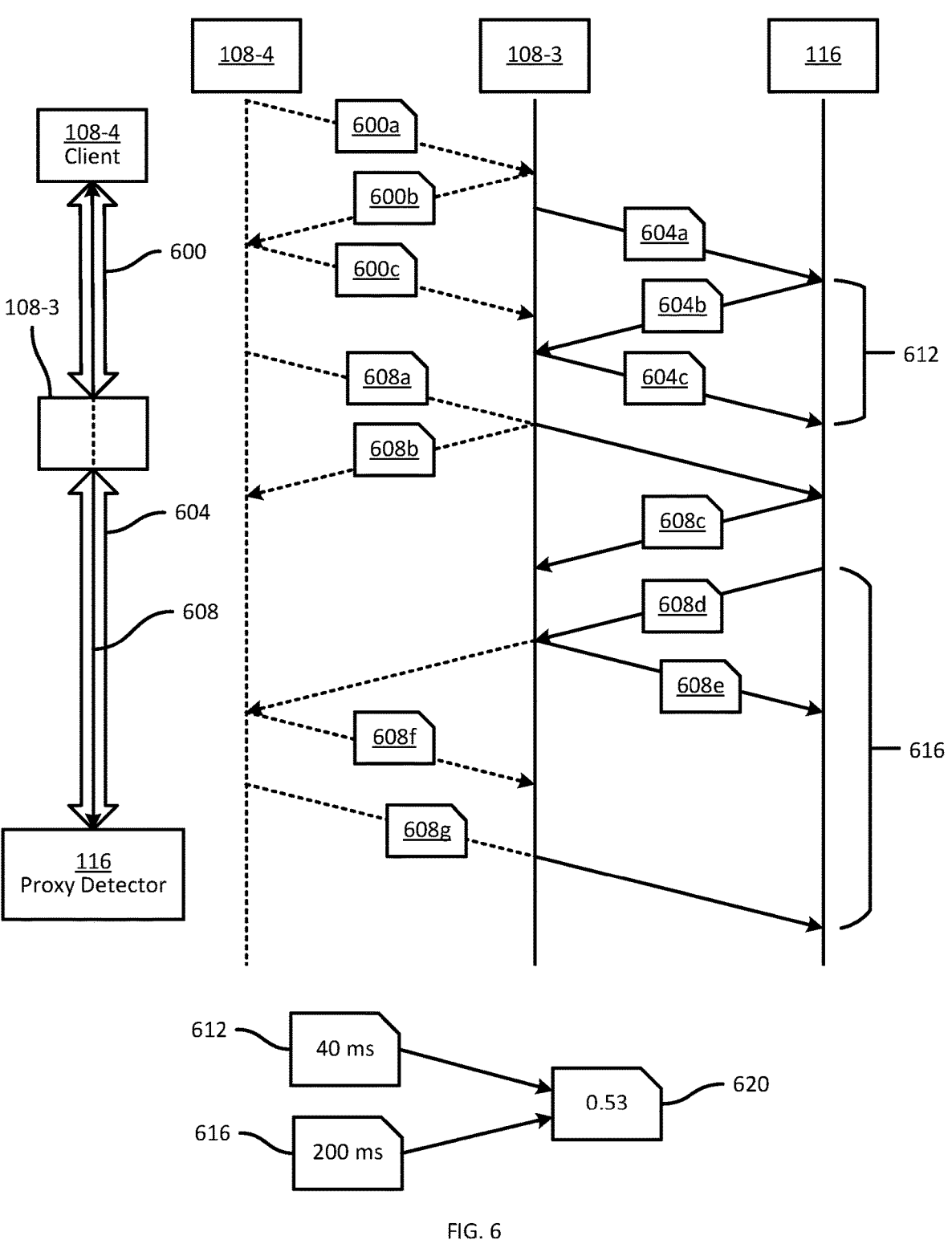
FIG. 6 is a diagram illustrating another example performance of blocks 310 to 340 of the method of FIG. 3.

Turning to FIG. 6, another example performance of the method 300 is illustrated, to contrast with the performance shown in FIG. 5, in which the client device 108-1 itself is both the nearest transport-layer device and the client endpoint for secure communications. In FIG. 6, on the other hand, the client device 108-3 acts as a proxy for the client device 108-4.

Prior to receipt of a request a the proxy detector 116 at block 305, the client device 108-4 initiates a transport-layer connection 600 with the client device 108-3, e.g., via a three-way handshake sequence implemented via the messages 600a (e.g., a SYN message), 600b (e.g., a SYN-ACK message), and 600c (e.g., an ACK message). Either after establishment of the connection 600, or (as illustrated) contemporaneously with establishment of the connection 600, the client device 108-1 initiates a transport-layer connection 604 with the proxy detector 116. Specifically, at block 305 the proxy detector receives a message 604a (e.g., a SYN message). At block 310, via the messages 604b and 604c, the proxy detector 116 and the client device 108-3 complete the establishment of the connection 604. At block 315, the proxy detector 116 determines a first time period 612 associated with the transport-layer connection 604, such as the RTT between transmission of the message 604b and receipt of the message 604c.

Once the connections 600 and 604 are established, the client device 108-4 can request establishment of a secure link 608 over the connections 600 and 604. Of particular note, the secure link 608 tunnels through the client device 108-3, and therefore cannot be initiated by the client device 108-3 itself. As a proxy, the client device 108-3 is configured only to route encrypted communications between the client device 108-4 and the proxy detector 116, using the connections 600 and 604 (but without accessing the contents of such communications).

At block 320, therefore, the proxy detector 116 can receive a request 608a (e.g., a Client Hello message) from the client device 108-3. The request 608a was originated at the client device 108-4, although that fact is not visible to the proxy detector 116. The client device 108-3 may acknowledge the message 608a to the client device 108-4 via a message 608b.

At block 325, the proxy detector 116 is configured to initiate or continue the relevant handshake sequence to establish the secure link 608. For example, as noted earlier, the proxy detector 116 can send an acknowledgement message 608c, which may be relayed to the client device 108-4 in some examples, but is not in the illustrated example. The proxy detector 116 can then send a message 608d, such as the previously mentioned Server Hello message, containing information necessary to establish the secure link 608 (e.g., supported cipher suites, and the like). The message 608d is relayed to the client device 108-4, and acknowledged via the an ACK message 608e by the client device 108-3. The message 608e, however, is not used by the proxy detector 116 to determine a time period 616 associated with the secure link 608, because the message 608e cannot be guaranteed to have originated at the client endpoint. The message 608e, that is, does not contain information that can only be generated or otherwise provided by the client endpoint of the secure link 608, and therefore may not (and in the illustrated example, does not) represent a true RTT between the proxy detector 116 and the client endpoint.

Once the message 608d is received at the client device 108-4, the client device 108-4 may send an acknowledgement 608f, which is not forwarded to the proxy detector 116 in this example, but can be forwarded in other examples. The client device 108-4 then sends a message 608g to complete the handshake sequence and establish the secure link 608. The message 608g is analogous to the message 500e shown in FIG. 5. To determine the time period 616 at block 330, the proxy detector 116 determines the time elapsed between transmission of the message 608d, and reception of the message 608g. More generally, as noted earlier, the proxy detector 116 determines the time elapsed between a message transmitted from the proxy detector 116 that necessarily terminates at the client endpoint for the secure connection 608, and a subsequent expected message that necessarily originates at the client endpoint.

As seen in FIG. 6, the need to relay messages between the client devices 108-3 and 108-4 increases the time elapsed to complete the secure link 608, while the time required to complete the transport-layer connection 604 is unchanged relative to FIG. 5. That is, the presence of a proxy does not affect the connection 604, but lengthens the RTT associated with the secure link 608.

To determine a score at block 335, the proxy detector 116 can be configured, as in the example of FIG. 5, to determine the difference between the time periods 612 and 616, and to normalize that difference, e.g., against a maximum of three hundred milliseconds. The result, as shown in FIG. 6, assuming values of forty milliseconds and two hundred milliseconds for the time periods 612 and 616, is a score 620 of 0.53. That is, the score 620 is significantly higher than the score 516, indicating a greater likelihood that the client device 108-3 is operating as a proxy.

As will be apparent, therefore, the system 100 and specifically the proxy detector 116 enables the detection of proxied client requests 112 in a manner sufficiently robust to detect residential proxies that may be challenging to detect using previous proxy-detection mechanisms, and in a manner that does not require the deployment of executable code to client devices, or any modification to the message flows between client devices 108 and the proxy detector 116.

Figure 7:
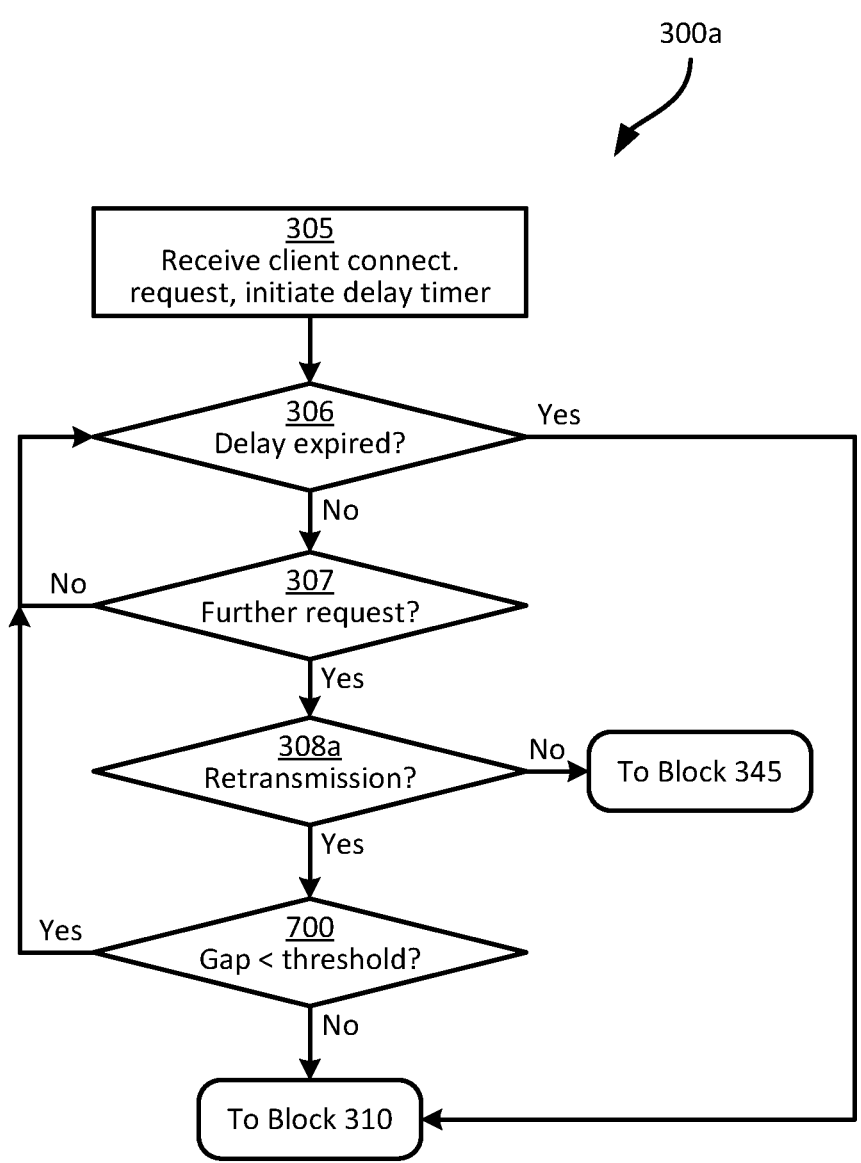
FIG. 7 is a flowchart of another proxy detection method.

In some embodiments, the proxy detector 116 can implement additional functionality, as shown in FIG. 7. FIG. 7 illustrates a method 300a of proxy detection. The method 300a includes the blocks of the method 300 as described in connection with FIG. 3, unless noted specifically below. Certain blocks of the method 300 are omitted from FIG. 7 for ease of illustration (e.g., blocks 310 to 350).

It has been observed that some residential proxies perform retransmissions employing the same IP address and port number, and may therefore escape detection. That is, if a proxy retransmits a SYN packet using the same port number as the SYN packet received by the proxy detector 116 at block 305, the determination at block 308 is affirmative, and the proxy detector 116 may proceed to block 310. Proxies performing such retransmission may implement application-level retransmission, for example in which the application 114 causes the retransmission of a SYN packet. Such application-level retransmission may be performed at a greater frequency than kernel-level retransmission. For example, while kernel retransmission may occur about one second after then initial SYN transmission, as noted earlier, certain proxy applications may cause SYN retransmission after a shorter period (e.g., half a second, although a wide variety of other periods may also be used). Such proxy applications may, for example, retransmit a SYN packet one or more times (e.g., using the same port number), before terminating the connection and beginning a new attempt with a different port number as described above.

To improve the likelihood of detecting such proxy applications, the proxy detector 116 can, following an affirmative determination at block 308a, proceed to block 700 instead of directly to block 310. Block 308a, in other words, involves the same determination as in block 308, but the outcome of the affirmative determination for block 308a differs from the outcome of the affirmative determination for block 308. At block 700, the detector 116 can be configured to compare a time period (referred to as a "gap" in FIG. 7) elapsed between the first request from block 305 and the most recent request from block 307 to a threshold, e.g., a configurable threshold stored in the memory 204. The threshold is smaller than the delay timer, and is also smaller than an expected (e.g., common among client devices 108) period after which a legitimate client device 108 is expected to retransmit the first request. For example, if legitimate client devices 108 are expected to retransmit after one second, the threshold applied at block 700 can be set to 0.75 seconds. As will be apparent, a wide variety of other thresholds can also be applied at block 700.

When the determination at block 700 is negative, the proxy detector 116 proceeds to block 310. A negative determination at block 700 indicates that the retransmission from the client device 108 did not occur significantly more quickly than expected for legitimate client devices 108. In other words, an affirmative determination at block 308a, combined with a negative determination at block 700, indicates that the requests from block 305 and 307 are not likely to have been proxied.

When the determination at block 700 is affirmative, rather than proceeding to block 310, the proxy detector 116 returns to block 306. If the delay timer has not expired, the proxy detector 116 therefore awaits a further request (e.g., a third SYN packet) from the same IP address, and repeats the determination at block 308a for the further request. In some examples, the performance of block 700 can be performed only once, such that the outcome of the second performance of block 308a is identical to block 308 (e.g., the proxy detector 116 proceeds to either block 310 or block 345). In other examples, however, the proxy detector 116 can be configured to repeat block 700 following another affirmative determination at block 308a. The gap assessed at block 700 is the time period elapsed between the first request (from block 305) and the most recent request (from block 307), as opposed to the most recent request from block 307 and the preceding request from block 307.

As will be apparent, the detection mechanisms discussed above can improve the ability of the request-handing subsystem 120 to detect residential proxy devices, and thus mitigate the costs imposed on the subsystem 120 of handling such requests. Proxy operators (e.g., the entities deploying the client 108-4 and/or the application 114) may therefore be faced with adopting less efficient retransmission mechanisms to avoid detection, and/or committing resources to develop other workarounds.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

Specific example embodiments have been described above. Those skilled in the art, however, will understand that various modifications can be made to the above-examples, within the scope of above teachings. The scope of the claims below should therefore not be limited by the specific embodiments set forth in the above examples, but should be given the broadest interpretation consistent with the description as a whole.

The invention claimed is:

1. A proxy detection method in a server, the method comprising:

receiving, from a client device, a first request to establish a transport-layer connection between the client device and the server, the first request containing a first source port number;

in response to receiving the first request and prior to establishing the transport-layer connection, initiating a delay timer and withholding transmission of an acknowledgement to the first request until expiry of the delay timer;

receiving from the client device, prior to expiry of the delay timer, a second request to establish the transport-layer connection;

in response to determining that the second request contains a second source port number matching the first source port number, initiating establishment of the transport-layer connection with the client device; and selecting, based on the determination, a handling action for the second request.

2. The method of claim 1, wherein selecting the handling action includes:

when the determination is negative, discarding the first request and the second request, without sending an acknowledgement to the client device.

3. The method of claim 1, wherein selecting the handling action includes:

when the determination is negative, providing an indication that the client device is likely a proxy for a client endpoint to an auxiliary detector.

4. The method of claim 1, wherein the transport-layer connection is based on the Transport Control Protocol (TCP), wherein the first request includes a SYN message, and wherein initiating establishment of the transport-layer connection includes sending a SYN-ACK message to the client device.

5. The method of claim 4, further comprising:

determining a first time period associated with the transport-layer connection;

in response to receiving, from the client device over the transport-layer connection, a second request to establish a secure link between a client endpoint and the server, transmitting a second message to the client endpoint according to a handshake sequence for establishing the secure link;

determining a second time period associated with completion of the second handshake sequence; and generating, based on the first time period and the second time period, a score indicating a likelihood that the client device is a proxy for the client endpoint.

6. The method of claim 5, wherein generating the score includes determining a difference between the first and second time periods.

7. The method of claim 5, wherein determining the first time period includes determining a time elapsed between transmission of the acknowledgement, and receipt of an ACK message from the client device.

8. The method of claim 1, wherein the first request contains a first sequence number;

and wherein the determination further comprises:

determining whether the second request contains a second sequence number matching the first sequence number.

9. The method of claim 8, wherein selecting the handling action includes:

when at least one of (i) the first source port number does not match the second source port number, or (ii) the first sequence number does not match the second sequence number, discarding the first request and the second request, without sending an acknowledgement to the client device.

10. The method of claim 1, wherein the delay timer is between 1 second and 2 seconds.

11. A computing device, comprising:

a communications interface; and a processor configured to:

receive via the communications interface, from a client device, a first request to establish a transport-layer connection between the client device and the server, the first request containing a first source port number;

in response to receiving the first request and prior to establishing the transport-layer connection, initiate a delay timer and withhold transmission of an acknowledgement to the first request until expiry of the delay timer;

receive from the client device, prior to expiry of the delay timer, a second request to establish the transport-layer connection;

in response to determining that the second request contains a second source port number matching the first source port number, initiate establishment of the transport-layer connection with the client device; and select, based on the determination, a handling action for the second request.

12. The computing device of claim 11, wherein the processor is configured to select the handling action by:

when the determination is negative, discarding the first request and the second request, without sending an acknowledgement to the client device.

13. The computing device of claim 11, wherein the processor is configured to select the handling action by:

when the determination is negative, providing an indication that the client device is likely a proxy for a client endpoint to an auxiliary detector.

14. The computing device of claim 11, wherein the transport-layer connection is based on the Transport Control Protocol (TCP), wherein the first request includes a SYN message, and wherein the processor is configured to initiate establishment of the transport-layer connection by sending a SYN-ACK message to the client device.

15. The computing device of claim 14, wherein the processor is further configured to:

determine a first time period elapsed between transmission of the acknowledgement, and receipt of an ACK message from the client device;

in response to receiving, from the client device over the transport-layer connection, a second request to establish a secure link between a client endpoint and the server, transmit a second message to the client endpoint according to a handshake sequence for establishing the secure link;

determine a second time period associated with completion of the second handshake sequence; and generate, based on the first time period and the second time period, a score indicating a likelihood that the client device is a proxy for the client endpoint.

16. The computing device of claim 15, wherein the processor is configured to generate the score by determining a difference between the first and second time periods.

17. The computing device of claim 15, wherein the processor is configured to determine the first time period by determining a time elapsed between transmission of the acknowledgement, and receipt of an ACK message from the client device.

18. The computing device of claim 11, wherein the first request contains a first sequence number; and wherein the determination further comprises:

determining whether the second request contains a second sequence number matching the first sequence number.

19. The computing device of claim 18, wherein the processor is configured to select the handling action by:

when at least one of (i) the first source port number does not match the second source port number, or (ii) the first sequence number does not match the second sequence number, discarding the first request and the second request, without sending an acknowledgement to the client device.

20. The computing device of claim 11, wherein the delay timer is between 1 second and 2 seconds.

* * * * *